(12) United States Patent
Keirse et al.

(10) Patent No.: US 8,904,958 B2
(45) Date of Patent: Dec. 9, 2014

(54) FEEDING DEVICE FOR POULTRY HAVING NON-SHARP-EDGED CIRCUMFERENTIALLY CLOSED BARS OR OTHER PARTS DELIMITING FEED OPENINGS BETWEEN THE BARS

(75) Inventors: Philippe Hyppoliet Pia Maria Keirse, Maldegem (BE); Jeroen Fiers, Ghent (BE)

(73) Assignee: Roxell N.V., Maldegem (BE)

(*) Notice: Subject to any disclaimer, the term of this patent is extended or adjusted under 35 U.S.C. 154(b) by 301 days.

(21) Appl. No.: 12/999,635

(22) PCT Filed: Jun. 16, 2009

(86) PCT No.: PCT/IB2009/005960
§ 371 (c)(1),
(2), (4) Date: Jan. 27, 2011

(87) PCT Pub. No.: WO2009/153645
PCT Pub. Date: Dec. 23, 2009

(65) Prior Publication Data
US 2011/0107972 A1    May 12, 2011

(30) Foreign Application Priority Data

Jun. 19, 2008 (NL) .................................. 2001700

(51) Int. Cl.
*A01K 39/014* (2006.01)
*A01K 39/012* (2006.01)

(52) U.S. Cl.
CPC .................................. *A01K 39/0125* (2013.01)
USPC .......................... 119/51.01; 119/57.4; 119/63

(58) Field of Classification Search
CPC  A01K 39/012; A01K 39/0125; A01K 5/0225
USPC .................................................... 119/57.4, 63
See application file for complete search history.

(56) References Cited

U.S. PATENT DOCUMENTS 3,094,448 A * 6/1963 Cornelius ........................ 156/78
3,602,292 A * 8/1971 Baur ............................. 164/360
(Continued)

FOREIGN PATENT DOCUMENTS

BE    1 001 219 A    12/2010
EP    0 421 553 A    4/1991
(Continued)

OTHER PUBLICATIONS

Search Report dated Jan. 5, 2009 for NL 2001700.
(Continued)

*Primary Examiner* — Tien Dinh
*Assistant Examiner* — Justin Benedik
(74) *Attorney, Agent, or Firm* — Thomas|Horstemeyer, LLP

(57) ABSTRACT

A feeding device for feeding poultry comprising a dish-shaped dispensing pan with an outer circumferential edge, a feed drop tube opening out above a central part of the pan such that a volume of feed transported to the drop tube is distributed over the bottom surface of the pan, and bars connecting the pan with the drop tube, in which openings are present between the bars for the poultry to have access to feed distributed in the pan, which openings are delimited by sides of parts of the device facing said openings. At least part of said sides of the parts facing said openings, in particular said bars, have a non-sharp-edged cross-section which is constructed circumferentially closed. The circumferentially closed parts are at least partly made out of a foam plastic.

14 Claims, 6 Drawing Sheets

(56) References Cited

U.S. PATENT DOCUMENTS

| | | | | |
|---|---|---|---|---|
| 4,077,511 | A * | 3/1978 | Mosijowsky | 206/0.5 |
| 5,007,380 | A * | 4/1991 | Badia et al. | 119/53 |
| 5,024,866 | A * | 6/1991 | Goode | 428/36.4 |
| 5,092,274 | A * | 3/1992 | Cole et al. | 119/57.4 |
| 5,097,797 | A * | 3/1992 | Van Zee et al. | 119/57.4 |
| 5,101,765 | A * | 4/1992 | Manfrin | 119/53 |
| 5,101,766 | A * | 4/1992 | Runion | 119/53 |
| 5,113,797 | A * | 5/1992 | van Daele | 119/53 |
| 5,265,911 | A * | 11/1993 | Goode | 280/819 |
| 5,275,131 | A * | 1/1994 | Brake et al. | 119/63 |
| 5,406,907 | A * | 4/1995 | Hart | 119/53 |
| 5,497,730 | A * | 3/1996 | van Daele et al. | 119/53 |
| 5,765,503 | A * | 6/1998 | van Daele | 119/52.4 |
| 5,809,934 | A | 9/1998 | Gavet | |
| 5,875,733 | A * | 3/1999 | Chen | 119/57.4 |
| 5,957,083 | A * | 9/1999 | Cheng | 119/57.4 |
| 6,050,220 | A * | 4/2000 | Kimmel et al. | 119/53 |
| 6,173,676 | B1 * | 1/2001 | Cole | 119/57.4 |
| 6,470,826 | B2 * | 10/2002 | Thuline | 119/52.4 |
| 6,474,261 | B1 * | 11/2002 | Turner et al. | 119/53 |
| 6,655,317 | B1 * | 12/2003 | Steudler et al. | 119/53 |
| 7,552,697 | B2 * | 6/2009 | Busse | 119/53 |
| D625,886 | S * | 10/2010 | Ellard | D30/131 |
| 8,074,601 | B2 * | 12/2011 | Van de Ven | 119/52.4 |

FOREIGN PATENT DOCUMENTS

| | | |
|---|---|---|
| EP | 0 626 133 A | 11/1994 |
| EP | 0 815 726 A | 7/1996 |
| EP | 1 342 409 A | 9/2003 |

OTHER PUBLICATIONS

PCT Search Report dated Oct. 21, 2009.

* cited by examiner

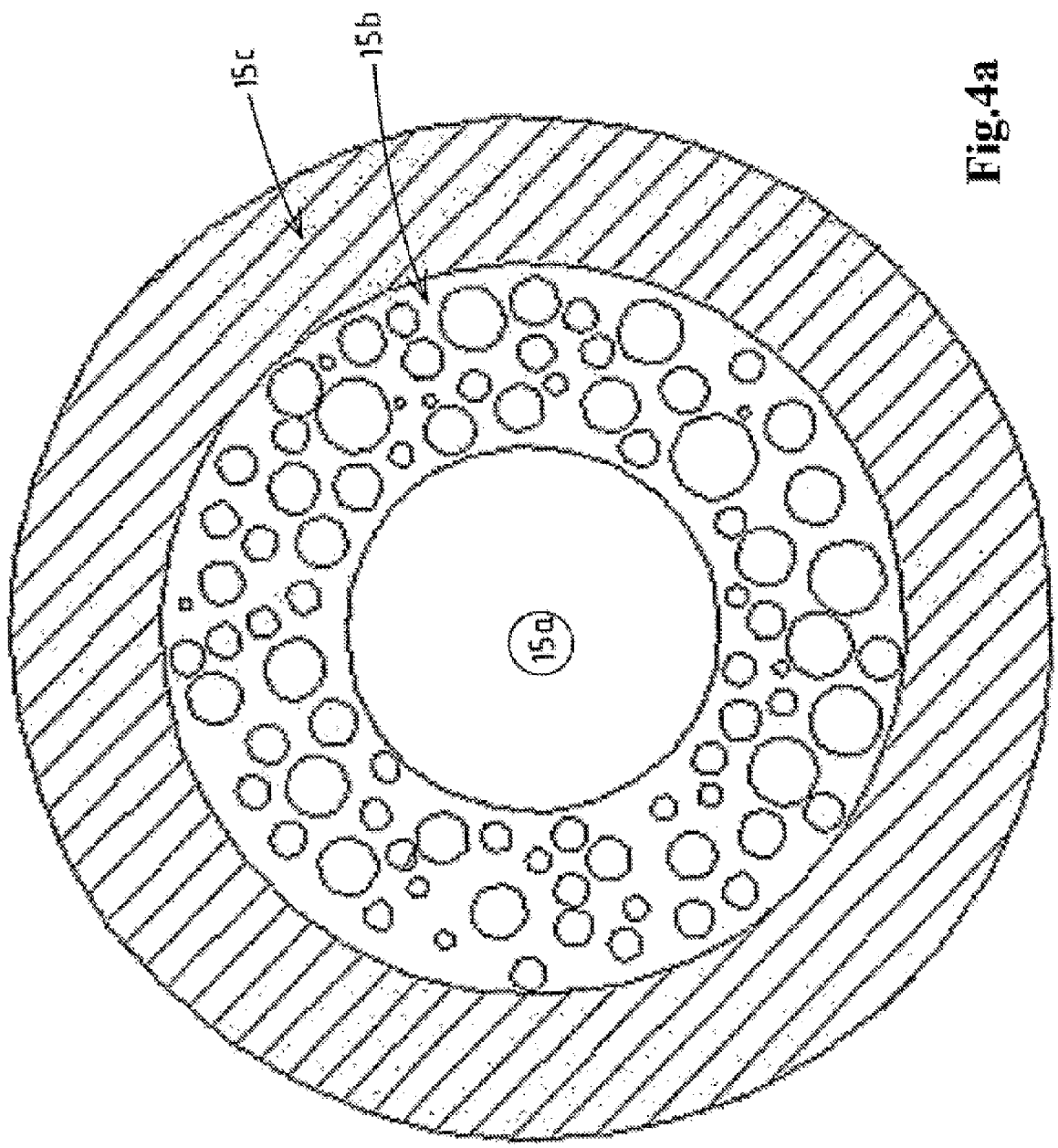

US 8,904,958 B2

FEEDING DEVICE FOR POULTRY HAVING NON-SHARP-EDGED CIRCUMFERENTIALLY CLOSED BARS OR OTHER PARTS DELIMITING FEED OPENINGS BETWEEN THE BARS

CROSS-REFERENCE TO RELATED APPLICATION

This application is the National Stage of International Application no. PCT/IB2009/005960 filed Jun. 16, 2009, which claims the benefit of Netherlands patent application number 2001700 filed Jun. 19, 2008, the contents of which are incorporated by reference as fully set forth herein.

FIELD OF THE INVENTION

The invention relates to a feeding device for poultry, in particular to a feeding device for cocks.

BACKGROUND

Such feeding devices are known in a wide variety of different embodiments. Most of them comprise a dish-shaped dispensing pan, a feed drop tube opening out above a central part of the pan in such a way that a volume of feed transported to the drop tube is distributed substantially evenly over the bottom surface of the pan. The pan is connected to the drop tube by means of several spoke-like plastic bars or carrying arms which are equally divided around the circumference of the device. Preferably the connection between the bars and the drop tube is not rigid but is such that the height of the drop tube with respect to the pan can be altered in order to influence the amount of feed which enters the pan. Between the bars openings are present for the poultry to have access to feed distributed in the pan. Each opening is at least large enough for one animal to put his head through, but also may be large enough for accommodating the heads of several animals standing next to each other. See for example EP-0 421 553, EP-0 626 133 or EP-0 815 726.

The known feeding devices have the disadvantage that their animal friendliness leaves to be desired. The animals run the risk that they hurt themselves during feeding at relatively sharp edges of the device. In order to pick out as much feed as possible out of the pan, the animals press themselves against the device. With this, any sharp edges present near the opening between the bars, are pushed against the animals body. At least this gives the animals an unpleasant feeling during feeding, giving them more stress. In particular when these known feeding devices are used for cocks, a risk exists that the cock hurts itself because its vulnerable comb or crest is injured at or gets hooked behind sharp edges of the device facing towards the openings. These sharp edges may for example form part of the plastic bars or the pan.

For example EP-0 421 553 shows an embodiment with a grille which comprises a number of plastic flat, curved bars. Each bar extends upwards from a lower ring which is snapped on an outer circumferential edge of the pan, towards an upper ring which grips around a drop tube. Each flat bar is oriented radially such that it points both inwardly and outwardly with its "sharp" side edges. Here a cock specifically runs the risk of tearing his comb because it gets stuck behind one of the bars.

For example EP-0 626 133 shows an embodiment with several plastic concave semi-circular support arms. Each support arm extends radially upwards from a local snap connection with the outer circumferential edge of the pan towards an upper conical body part which in turn grips around a drop tube. Here, each bar has the disadvantage that it points outwardly with two "sharp" side edges caused by its concavely oriented semi-circular support arms. Here an animal undergoes the negative sensation of feeling the impression of the sharp edge against for example his chest. It is noted that a convex orientation for such semi-circular support arms is also known. However, then each bar still has the disadvantage that it points inwardly with its two "sharp" side edges caused by its convexly oriented semi-circular support arms. In that case a cock specifically runs the risk of tearing his comb because it gets stuck behind one of the bars.

Finally, EP-0 815 726 shows an embodiment with an inner and outer grill each comprising a number of plastic flat, curved bars. Each bar extends upwards from a lower ring which is snapped on an outer circumferential edge of the pan, towards an upper conical body part which in turn grips around a drop tube. Each flat bar is oriented tangentially such that its "sharp" side edges directly point sideways towards the feed openings at the respective sides of said bar. In that case the animal on the one hand has the negative sensation of feeling the impression of the sharp edge and on the other hand runs the risk of getting stuck behind one of the edges.

It is noted that some older patent publications already show feeding device constructions with a grill having some of its construction parts delimiting the openings between the bars formed by rounded parts.

For example U.S. Pat. No. 5,875,733 shows a feeding device having a grill assembly with an upper and lower ring and a plurality of ribs extending there between. The ribs are formed by bars each having a circular closed cross-section.

These bars however are likely to be made of metal and thus massive. This makes the grill of the feeding pan rather heavy and expensive. Furthermore, with U.S. Pat. No. 5,875,733 the lower ring of the grill assembly is rectangular cornered and thus is still sharp-edged at both its inner and outer side.

Another example is EP-1 342 409 which shows a feeding device having a dispensing pan of which the upper outer circumferential edge is a circular thickening seen in cross section.

This thickened circumferential edge however gives the feeding pan a non-uniform wall thickness and thus may form a hot spot during moulding of the pan. In order to avoid deformation of the pan during cooling at the end of the moulding process, special care must be taken. Furthermore, with EP-1 342 409 the bars of the grill are T-shaped in cross section and thus is still sharp-edged in three directions. Also a lower flat upstanding ring of the grill projects somewhat above the thickened circumferential edge of the pan, and thus is also still sharp-edged. Another disadvantage of this known feeding device is that it is difficult to clean at the locations of the parts extending around its feeding openings. For example each bar includes and covers dead zones which are hard to reach with a high pressure hose during a cleaning cycle.

SUMMARY

The present invention aims to at least partially overcome the abovementioned disadvantages, or to provide a usable alternative. In a particular embodiment the invention aims to provide a feeding device which is animal friendly, hygienic and easy to clean, and which minimises the risk of the poultry to get injured during feeding without making the device too vulnerable, heavy or expensive.

This aim is achieved by a feeding device according to the present disclosure. The feeding device comprises a dish-shaped dispensing pan, a feed drop tube and bars connecting the pan with the drop tube, in particular by means of an adjuster ring. Openings are present between the bars for the poultry to have access to feed distributed in the pan, which openings are delimited at least partly by sides having non-sharp-edged cross-sections of a plastic material which are constructed circumferentially closed and at the same time are at least partly made out of a foamed plastic. This specific construction of at least part of the side edges not only is more animal friendly but in addition has the advantage that a built up of for example old feed, dirt or other infection hazards are no longer possible at these locations. Furthermore, the non-sharp-edged circumferentially closed foamed plastic sides enlarge the strength and rigidity of the construction without having to add weight to these construction parts or having to use other more expensive materials. In particular poultry like cocks no longer run the risk of damaging their combs or crests, and poultry in general is less likely to experience stress during feeding. The foam structure according to the invention makes it even possible to construct the circumferentially closed non-sharp-edged parts around the feeding openings relatively thick without adding too much weight and while keeping the manufacturing process economic. The thicker the parts, the lower the risk the animals hurt themselves. Another advantage of the non-sharp-edged circumferentially closed foamed plastic sides is that they are easy to clean. For example if the bars are constructed with the non-sharp-edged circumferentially closed foamed plastic structure then they can easily be cleaned with for example a high pressure hose all around their circumference since they do not include or cover dead zones.

In an embodiment the dish-shaped dispensing pan has an outer circumferential edge. The feed drop tube can include an opening out above a central part of the pan such that a volume of feed transported to the drop tube is distributed over the bottom surface of the pan.

In a further embodiment the circumferentially closed plastic parts comprise a plurality of gas or vapour enclosures which have been obtained by addition of a foaming agent to the plastic preceding or during a moulding process. This foaming agent has the characteristic of releasing high volumes of gas or vapour bubbles in the circumferentially closed plastic parts during the moulding process. These bubbles get entrapped in the plastic during cooling of the moulded product and thus form the foamed plastic part.

The foaming agent may be chemical blowing additives that release high volumes of a gas, and/or physical blowing additives, volatile liquids or compressed gases that change their state during processing to release high volumes of gas or vapours. The chemical blowing additives, exothermic or endothermic ones, may for example be azodicarbonamide, phenyltetrazole, dinitrosopentamethylene tetramine, sulfonyl hydrazide, oxy bis(benzenesulfonyl hydrazide), sulfonyl semicarbazide, bicarbonates, citric acid, trisodium citrate, or sodium borohydride. The physical blowing additives may for example be pentane, carbon dioxide, water, HFC, HCFC or other fluorocarbones.

In a further embodiment the gas or vapour enclosures are only present in a middle and/or center part of the foamed plastic parts whereas the outer walls thereof remain closed and smooth. The closed outer walls prevent food particles or dirt to accumulate in the foam structure.

In an even further embodiment the circumferentially closed parts seen in cross section comprise a longitudinal hollow core section, which longitudinal hollow core section is surrounded by a middle foam section with a plurality of gas or vapour enclosures, around which middle foam section a closed massive outer wall section is provided. This provides for a good combination between strength, weight and hygiene.

In a specific embodiment at least the bars connecting the pan with the drop tube are arranged with the non-sharp-edged circumferentially closed at least partly foamed cross-section. This already offers a significant improvement because in practice it has appeared that these upwardly extending bars bring along a great risk for injuries, particularly for cocks when they are fighting somewhat with each other about the feed. In the alternative or in addition, other parts circumventing the openings, like the outer circumferential edge of the dish-shaped dispensing pan, are likewise arranged with non-sharp-edged circumferentially closed cross-sections.

The non-sharp-edged circumferentially closed cross-section(s) may be given any particular shape within the given definition. Preferably they have been given a rounded cross-section, in particular circular or oval shaped.

In a further embodiment the circumferentially closed parts of the device have a diameter (of an inscribed circle) of at least 5 mm and/or at most 100 mm. Thus a proper strength is optimally combined with a proper distribution of pressure over the animals body when pressing itself against it and without being able to hook part of its body behind it.

The at least partly foamed circumferentially closed parts advantageously are manufactured out of a suitable plastic, preferably out of similar families of plastics like other parts of the feeding device which do not have a foam structure. The plastics preferably has a low processing temperature, like polypropylene or polyethylene. The parts may furthermore be made hollow, for example by having been moulded using a simultaneous injection of a medium for forming said hollow during the moulding process.

Further advantageous embodiments are stated in the subclaims.

BRIEF DESCRIPTION OF THE DRAWINGS

Below the invention shall be clarified in further detail with respect to a possible embodiment as shown in the drawings, in which:

FIG. 4a shows a first embodiment of a cross-section of one of the bars of FIG. 1 at an enlarged scale constructed with a central hollow and foamed middle section;

DETAILED DESCRIPTION

Figure 1:
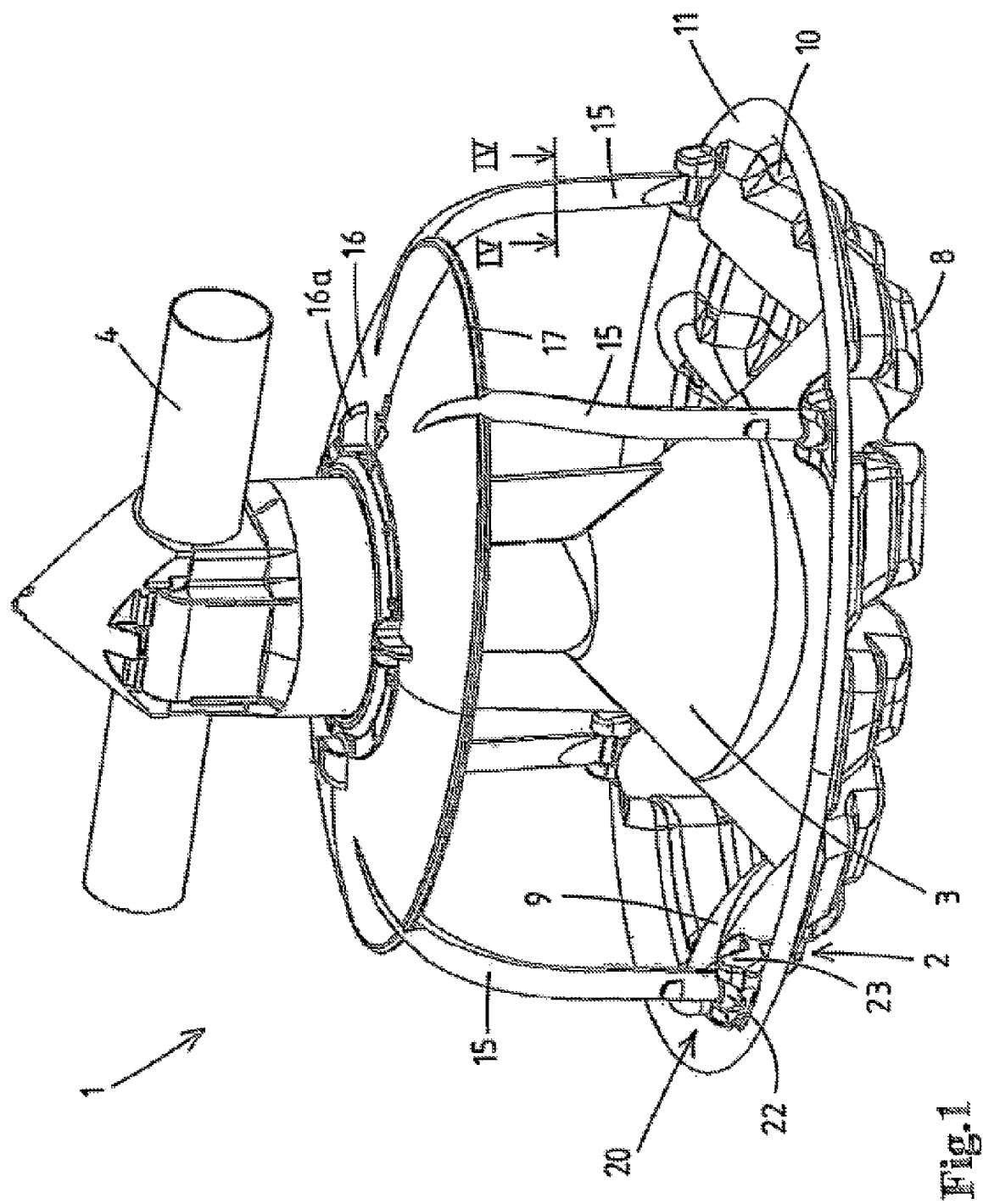
FIG. 1 is a perspective view of a feeding device seen from the side of a first pair of two adjacent hinge joints with bars shaped according to the invention.
Figure 2:
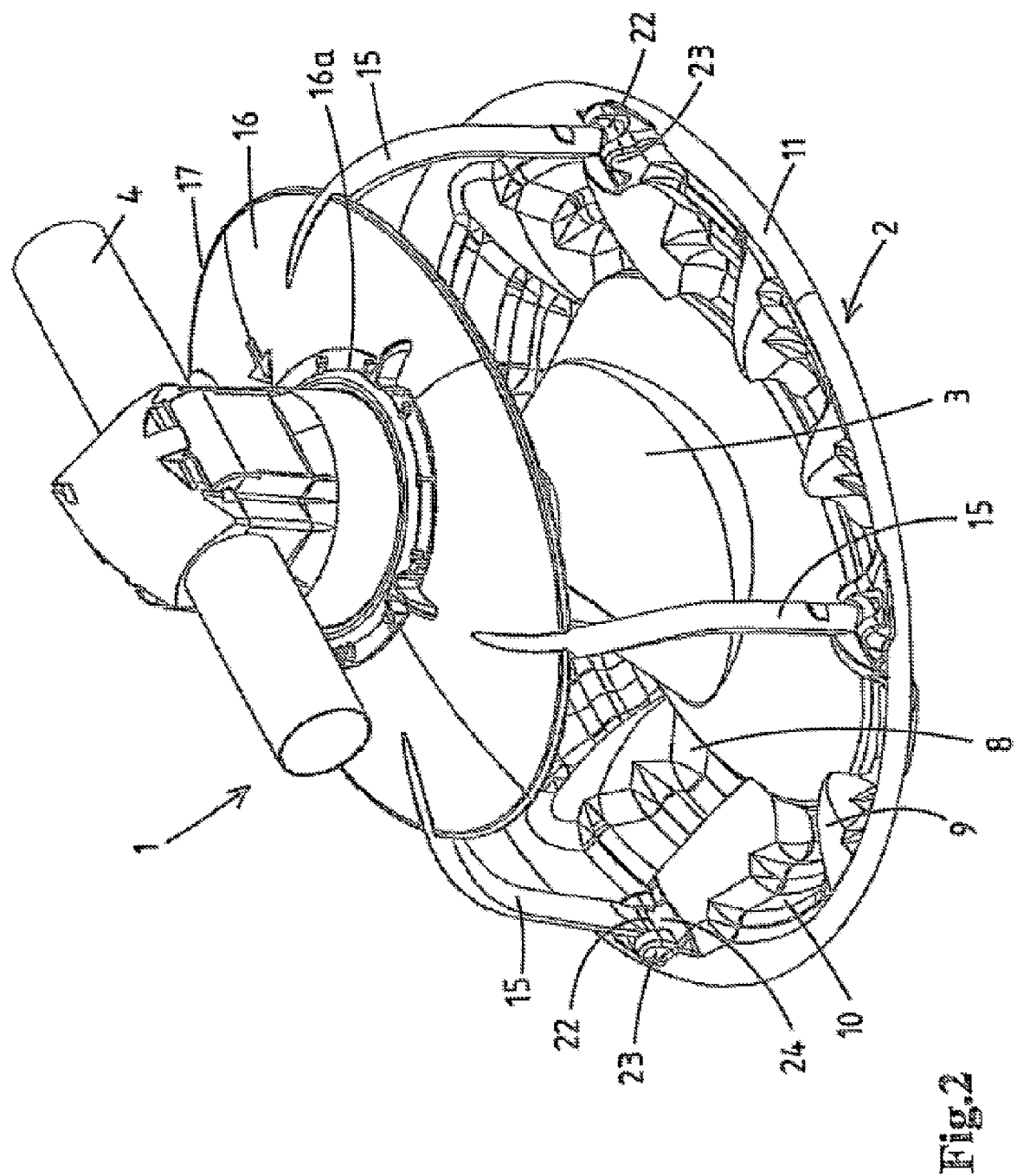
FIG. 2 is a view similar to FIG. 1 seen from another side.
Figure 3:
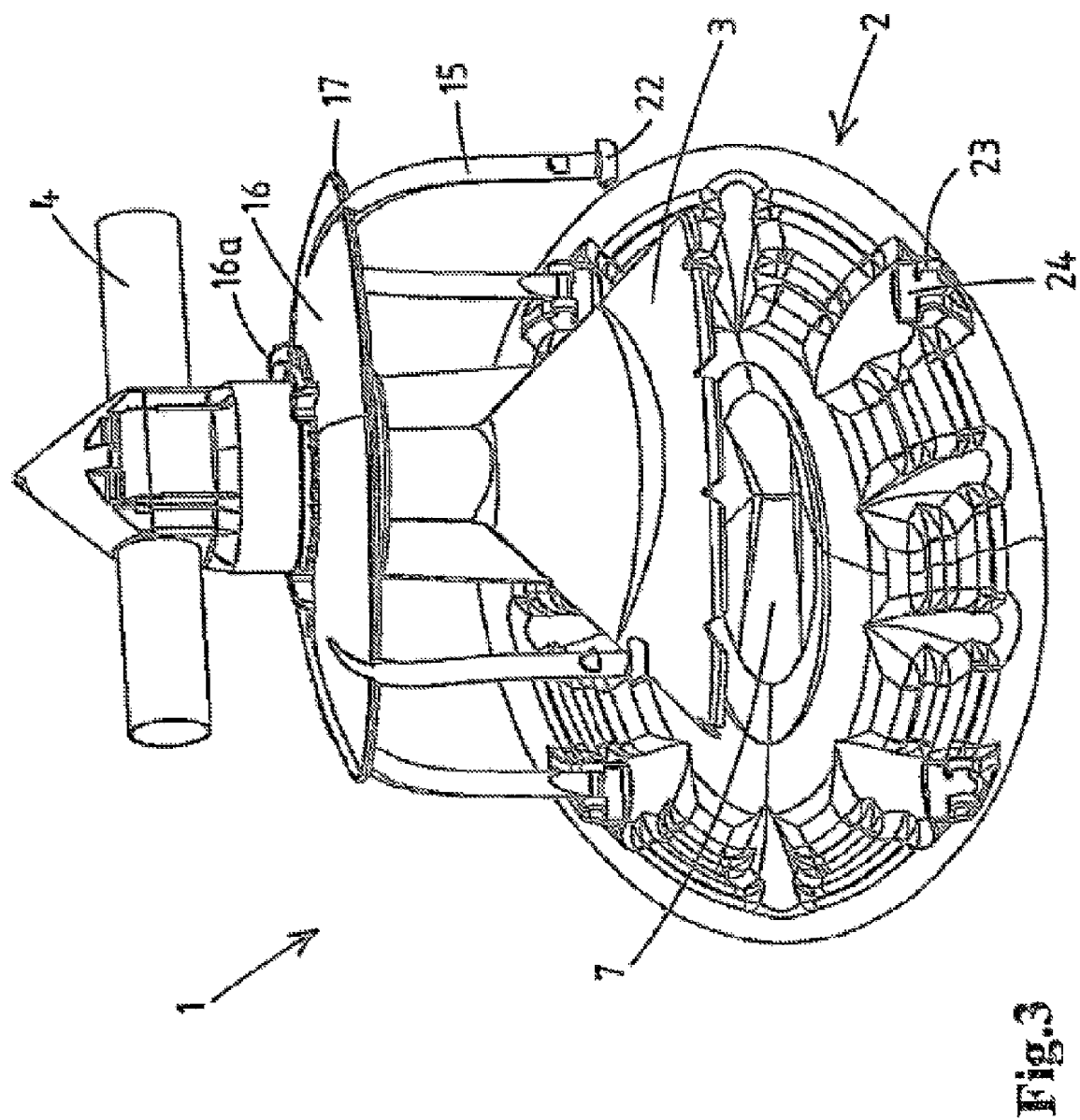
FIG. 3 is a view similar to FIG. 1 with the pan in its downwardly hanging open position.

In FIGS. 1-3 the entire feeding device is referenced with the numeral 1. The device 1 comprises a plastic dish-shaped dispensing pan 2 with a substantially vertically orientated plastic drop tube 3 positioned there above. The upper end of the drop tube 3 is to be connected to an outlet opening of a vertical feed transport pipe 4. The lower end of the drop tube 3 has a diverging shape, and is positioned above a central part of the dispensing pan 2. The drop tube 3 cooperates with a raised mid section 7 of the dispensing pan 2 (see FIG. 3). In particular an opening exists between the drop tube 3 and the raised mid section 7 through which feed can flow towards a lower part of the dispensing pan 2. The drop tube 3 is adjustable in height with respect to the pan 2, such that the feed can be offered at several heights in the dispensing pan 2. The raised mid section 7 connects to a bottom surface 8 which here comprises some kind of step shaped gutter subdivided by transverse ribs 9. The step shaped gutter merges into an upwardly extending side wall 10 with an outer circumferential edge 11

At the location of the edge 11 the pan 2 is connected to four plastic bars 15 which in turn are connected to a collar 16 which grips around the drop tube 3 via an adjuster ring 16*a*. Between the outer circumferential edge 11 of the pan 2, the bars 15 and an outer circumferential edge 17 of the collar 16 openings are present for poultry to have access to feed distributed in the pan 2.

According to the invention the bars 15 have a circular closed cross-section which is at least partly foamed. The diameter preferably is at least 5 mm and at most 100 mm, in particular lies between 5-50 mm, more particularly lies between 5-30 mm, and for example is approximately 6 mm.

FIG. 4*a* shows an embodiment in which the bar 15 is formed by a hollow plastic pipe or tube with which a hollow core section 15*a* is surrounded by a foamed middle section 15*b*, around which foamed middle section a smoothly closed massive outer wall section 15*c* is provided. As can be seen the foamed middle section 15*b* comprises a plurality of small pores which are formed in the plastic during the moulding process. The porous foamed structure gives the bars their required strength while keeping their weight relatively low. Also it prevents the forming of local hot spots during the moulding process.

Figure 4B:
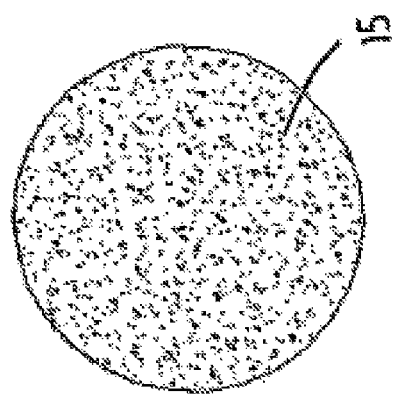
FIG. 4b shows a second embodiment of a cross-section of one of the bars of FIG. 1 fully made out of a foam material.

FIG. 4*b* shows an embodiment in which the bar 15 is formed by a substantially fully foamed plastic pole or rod. Here also the porous foamed structure gives the bars their advantageous strength-weight ratio.

Figure 5:
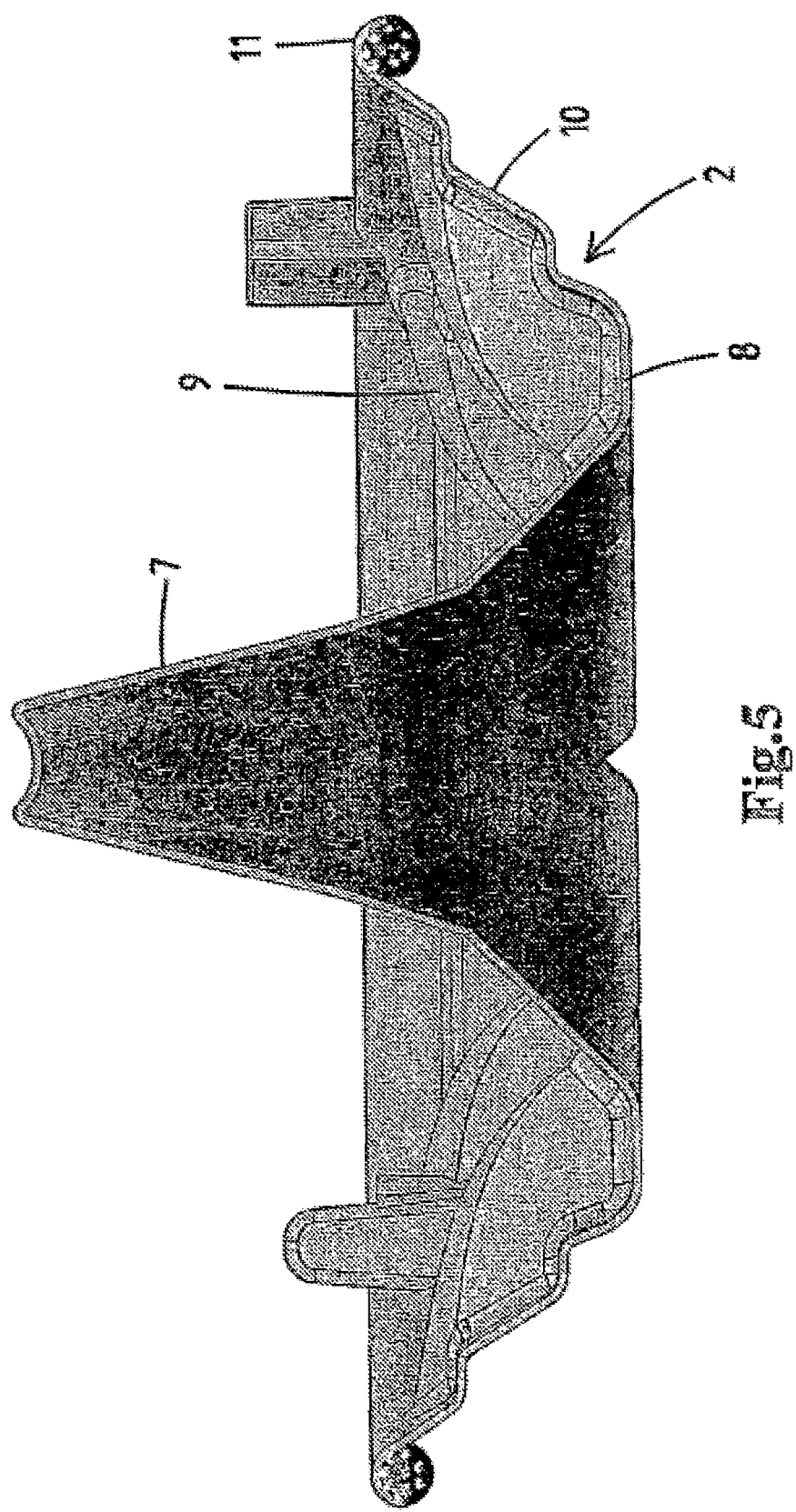
FIG. 5 is cross section of a variant embodiment of the pan in FIG. 1 with its circumferential edge shaped according to the invention.

The circumferential edges of the plastic pan 2 and/or collar 16 may be constructed likewise with a fully rounded partly or wholly foamed cross-section. For example FIG. 5 shows a variant in which the pan 2 has a fully closed hollow pipe-shaped outer circumferential edge 11 with a foam structure.

Owing to these circumferentially closed plastic at least partly foamed cross-sections without sharp edges provided at the most critical device parts surrounding the openings, the poultry is less stressed during feeding and runs a much lower risk of getting hurt. Furthermore, the device has gained strength and has become more rigid. Because of the circumferentially closed shapes, dead zones are avoided where otherwise dirt could accumulate and infectious bacteria could start growing.

The pan 2 including its integrally formed outer circumferential edge 11, and/or the bars 15, and/or the collar 16 and/or the drop tube 3 are preferably manufactured out of the same plastic material, for example polypropylene.

The device 1 is of the oval type, and both the pan 2 and the collar 16 have oval shapes. Each of the four bars 15 are connected by means of hinge joints 20 with the pan 2. For this each hinge joint 20 comprises a (vertical) connection pen connected with its respective bar 15, for example by partly pressing it inside a hollow of this bar 15. Further, the hinge joint 20 comprises a (horizontal) pivot pen 22. The pivot pen 22 can also be a ball joint or other suitable pivot means. The connection pen and pivot pen 22 may also be integrated with the bar 15 as one part. The pan 2 near its circumferential edge 11 is provided with four upwardly extending hinge joint housing parts 23. Each housing part 23 delimits a space for accommodating its respective pivot pen 22. This space is easily accessible for the pivot pen 22 by means of a turned around T-shaped slit 24 (see FIG. 3) with dimensions corresponding to those of the pivot pen 22 and the connection pen respectively. Thus the pan 2 is quickly mountable to and dismountable from the rest of the device 1 by dismounting each of the pivot pens 22 out of its corresponding housing part 23. Also it is possible for the user to only disconnect one pair of adjacent hinge joints 20, and subsequently rotate the pan 2 towards a downwardly hanging open position around its other pair of adjacent hinge joints 20 (see FIG. 3). Advantageously the user has a free choice which of the two pairs of adjacent hinge joints he wants to keep operative, and thus the freedom towards which side he wants the pan 2 to swing open to. This may offer him advantages with respect to cleaning and/or maintenance operations.

Besides the embodiments shown, numerous variants are possible. For example the bars and/or the circumferential edges of the pan and/or collar may also be given another non-sharp-edged shape which is circumferentially closed, like an oval shape or rounded triangular shape, or hexagonal shape, etc. The device may also be of another type like a "round" type having a round pan seen in top view, and the several parts of the device may be given any other desired shape or built up out of other suitable materials. Also another number of bars may be provided, for example such a number of bars that they delimit openings which are suitable for giving entrance to only one animal per opening. The collar may be dispensed with. Other types of hinge joints and connections between the pan and the bars are also well possible. Instead of two pairs of hinge joints at both longitudinal sides of the device, it is also possible to only provide one pair of adjacent hinge joints whereas the other bars then may be connected to the pan by means of easily dismountable connections, for example click-in means. It is noted that the idea of the at least two hinge joints is also advantageous without the idea of the non-sharp-edged circumferentially closed sides around the openings.

The invention is particularly suitable for feeding devices which are specifically destined for cocks or other poultry having vulnerable body parts on or near their heads.

Thus a simple feeding device with non-sharp-edged circumferentially closed at least partly foamed construction parts is provided which is easy and relatively cheap to manufacture, which is very friendly for the animals during feeding and which is very friendly for the farmer, for example during cleaning.

The invention claimed is:

1. A feeding device for feeding poultry comprising:
    a dish-shaped dispensing pan with an outer circumferential edge;
    a feed drop tube opening out above a central part of the pan such that a volume of feed transported to the drop tube is distributed over the bottom surface of the pan; and
    bars connecting the pan with the drop tube;
    in which openings are present between the bars for the poultry to have access to feed distributed in the pan, which openings are delimited by sides of parts of the device facing said openings, in which at least part of said sides of the parts facing said openings have a non-sharp-edged cross-section which is constructed circumferentially closed,
    wherein the circumferentially closed parts at least partly are made of a foam plastic, and the circumferentially closed parts seen in cross-section comprise a middle foam section with a plurality of gas or vapour enclosures, around which middle foam section a solid outer wall section is provided.

2. Feeding device according to claim 1, wherein the circumferentially closed parts are hollow.

3. Feeding device according to claim 2, wherein the circumferentially closed parts have been moulded using a simultaneous injection of a medium for forming said hollow.

4. Feeding device according to claim 1, wherein a longitudinal hollow core section is provided within the circumferentially closed parts, which longitudinal hollow core section is surrounded by the middle foam section.

5. Feeding device according to claim 1, wherein the circumferentially closed parts that are at least partly made of the foam plastic comprise gas or vapour enclosures which have been obtained by addition of a foaming agent to the plastic preceding a moulding step, which foaming agent changes its state during the moulding step to release gas or vapour in the circumferentially closed parts.

6. Feeding device according to claim 5, wherein the foaming agent is one of a chemical blowing additive, a physical blowing additive, a volatile liquid or a compressed gas.

7. Feeding device according to claim 1, wherein furthermore the outer circumferential edge of the dish-shaped dispensing pan has a non-sharp-edged cross-section which is constructed circumferentially closed.

8. Feeding device according to claim 7, wherein the circumferentially closed parts have a circular or oval shaped cross-section.

9. Feeding device according to claim 1, wherein the circumferentially closed parts have a rounded cross-section.

10. Feeding device according to claim 1, wherein the circumferentially closed parts of the device have a diameter of an inscribed circle of at least 5 mm.

11. Feeding device according to claim 1, wherein the circumferentially closed parts of the device have a diameter of an inscribed circle of at most 100 mm.

12. Feeding device according to claim 1, wherein each bar has a central longitudinal axis that extends rounded from a substantially vertical direction towards a substantially horizontal direction.

13. Feeding device according to claim 1, wherein a collar adjoining the drop tube is provided, and wherein the bars are extending towards said collar, said collar having an outer circumferential edge partly delimiting said openings on an upper side of the openings.

14. Feeding device according to claim 13, wherein furthermore, the outer circumferential edge of the collar has a non-sharp-edged cross-section which is constructed circumferentially closed.

* * * * *